Figure 1:
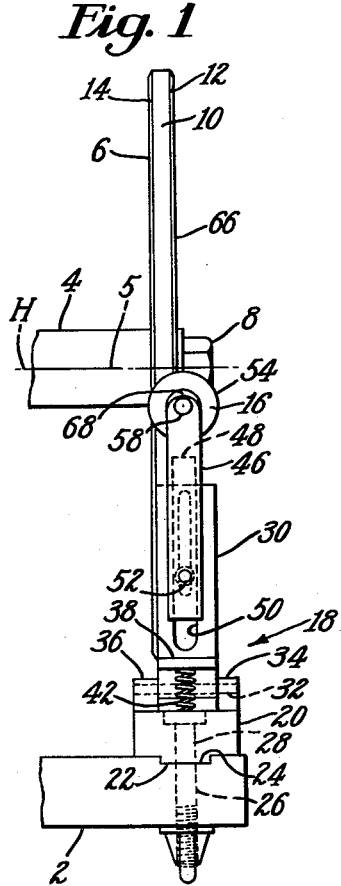

Inventors
Terence J. L. Clarke
Arthur W. Prichard
By their Attorney
Richard A. Wise

United States Patent Office 3,171,317
Patented Mar. 2, 1965

3,171,317
FLASH TRIMMING MACHINES
Terence James Leonard Clarke and Arthur William Prichard, Leicester, England, assignors to United Shoe Machinery Corporation, Boston, Mass., a corporation of New Jersey
Filed Nov. 28, 1960, Ser. No. 72,000
Claims priority, application Great Britain, Dec. 4, 1959, 41,208/59
3 Claims. (Cl. 83—496)

This invention relates to trimming and particularly to machines for trimming articles having thin peripheral flash, such as molded rubber outsoles and heels. At the present time many articles of rubber or similar materials formed by molding have a common characteristic of having a comparatively thin peripheral flash caused by incomplete contact of adjacent portions of their molds. The need for a machine for trimming flash from molded soles and heels is particularly acute at the present time because of the increasing popularity of vulcanized shoes, i.e. shoes provided with rubber sole and heel units, which are molded and attached to the shoes in one operation. Since vulcanized shoes are less expensive than those made, for example, by the Goodyear welt process, the remedial operations, such as trimming flash from such shoes should therefore be accomplished at a minimum expense as should those constructive operations necessary to produce the shoe. Also, since the profit margins on less expensive shoes are obviously less than in the more expensive types, it follows that machines for flash trimming, should be inexpensive to construct as well as simple to operate, therefore minimizing the need for skilled operators. At the present time, trimming of flash from molded outsoles and heels is usually carried out by hand with the help of scissors, which process, while not expensive from the machinery standpoint, is extremely time consuming making the over-all operation expensive because of labor costs.

It is, therefore, an object of this invention to provide a machine for triming flash from molded outsoles and the like which is inexpensive to construct and easy to operate.

Another object of this invention is to provide a flash trimming machine for molded outsoles and the like which has few, if any, complex parts and has a trimming locality which is free from obstruction so that flash may be readily presented.

In accordance with these objects and as a feature of this invention there is provided a machine for trimming flash from molded outsoles and the like which employs a disk of fiber reinforced resin rotated by a motor about a horizontal axis. Cooperating with the disk is a frusto-conical knife which is substantially smaller than the disk. The knife is mounted for free rotation about a horizontal axis normal to that of the disk with the base of the frusto-conical knife in engagement with the periphery of the disk. The knife is mounted on support means which is adjustable horizontally and vertically and is urged against the periphery of the disk by spring pressure. One edge of the disk is beveled to form a conical surface adjacent the cylindrical periphery. The axis about which the knife rotates is spaced from the central plane of rotation of the disk so that only a portion of the edge of the knife engages the disk at any one time. The knife thereby is rotated during the trimming operation which takes place at the intersection of the knife edge and the edge of the disk, the rotation of the knife minimizing wear on the knife and disk.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

Figure 2:
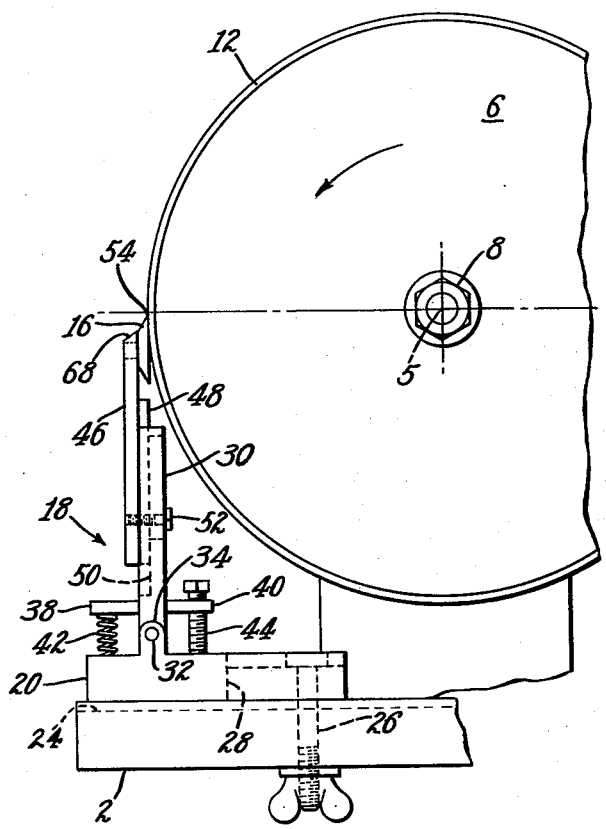
Figure 3:
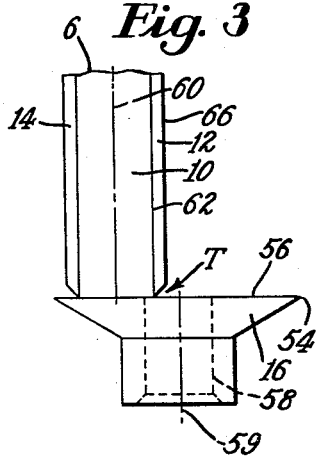
Figure 4:
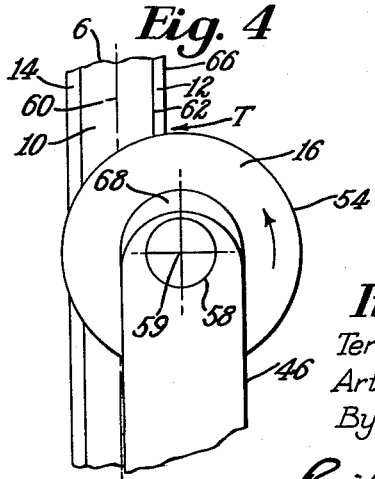

In the drawings.
FIG. 1 is a front elevation of a flash trimming machine embodying the invention;
FIG. 2 is a side elevation of the machine shown in FIG. 1;
FIG. 3 is a plan view on an enlarged scale of the mechanism at the trimming locality of the illustrative machine; and,
FIG. 4 is a front elevation of the mechanism shown in FIG. 3.

The machine comprises a table 2 on which is supported a horizontal shaft 4 rotated about an axis 5 by an electric motor (not shown). A cylindrical disk 6 is secured to the shaft 4 by a nut 8. The disk is made of a hard, fiber reinforced resin of the type including linen reinforced with phenol formaldehyde resin. Such material is marketed under the trade name "Micarta" among others. At least the right hand and preferably both edges of the disk 6 are chamfered at 45° leaving a circumferential cylindrical surface 10 and two conical surfaces 12 and 14.

A trimming member or knife 16 is mounted on a support 18 which is adjustably secured to the table 2. The support comprises a base 20 having a tongue 22 fitting a groove 24 in the table 2 which extends normal to the axis of rotation 5 of the shaft 4. A locking screw 26 extends through a slot 28 in the base 20 into the table 2 to lock the base to the table after it has been adjusted lengthwise of the groove 24. A vertical arm 30 is pivoted on a stud 32 in lugs 34, 36 extending upwardly from the base 20. Horizontal arms 38, 40 extend from the vertical arm 30 parallel to the base 20 and a spring 42 is compressed between the arm 38 and the top of the base 20. A stop screw 44 is threaded through the arm 40 and engages the upper surface of the base 20 to limit clockwise (as viewed in FIG. 2) pivotal movement of the vertical arm 30 under the force of the spring 42. An extension 46 is adjustably secured to the vertical arm 30 by a tongue 48 received within a slot 50 in the arm 30. A locking screw 52 secures the extension 46 to the arm 30 in adjusted position.

The trimming member 16 is in the form of a small circular knife having a sharpened edge 54. It is frusto-conical in shape, the angle of the cone being 120°. The cutting edge therefore forms a 30° angle with the larger plane surface or base 56 (FIG. 3). The member 16 is freely mounted on a stud 58 secured to the extension 46 with the base 56 facing the disk 6. The axis 59 of the stud 58 and, consequently the trimming member 16, is substantially parallel to the central plane of rotation 60 of the disk 6 and slightly to its right as viewed by an operator. The base 56 and, consequently the knife edge 54, are resiliently urged against the cylindrical surface 10 of the disk 6 by the spring 42. The knife is adjusted so that its base 56 extends approximately vertically with the knife edge 54 engaging the surface 10 of the disk 6 slightly below the horizontal plane H passing through the axis of rotation of the disk.

Only a small portion of the knife edge 54 actually touches the disk 6 and does so in the locality of the circular intersection 62 of the beveled edge 12 and the cylindrical surface 10. The trimming locality T is the point where the edge 62 and the knife edge 54 meet and is defined by the apex of the acute angle between the base 56 of the knife and a line in the conical surface 12 passing through their point of intersection.

The disk is rotated in a counterclockwise direction, as viewed in FIG. 2. A molded rubber outsole, either attached to a shoe or unattached, or any other similar work having a peripheral flash, is presented to the trimming locality so that the flash lies generally radially of the disk 6 and the point of trim is moved somewhat downwardly into the angle or notch between the beveled edge 12 and the knife edge 54 which defines the trimming locality T. The flash is engaged by the right-hand surface 66 of the disk and pulled downwardly against the knife edge 54 which rotates in a counterclockwise direction as viewed in FIGS. 1 and 4. We believe that the actual severing takes place where the beveled surface 12 and the knife edge meet, i.e., at the cylindrical edge 62. The tension imparted to the flash by the disk 6 causes it to stretch at the point of trim resulting in virtually all of the flash being removed. There is little, if any, obstruction around the trimming locality which is further assured by the upper edge of the support arm extension 46 being beveled as at 68.

As a specific example of a machine constructed in accordance with this invention, the diameter of the cylindrical surface of the disk is 6″. Its edges are chamfered at 45° and the circumferential surface 10 is 3/16″ wide. The trimming member 16 is .625″ in diameter and .096″ thick. Its base 56 bears against the surface 10 of the disk 6 with approximately one pound of pressure. Since the trimming member 16 rotates, its wear and that of the surface 10 is relatively slight, being considerably less than if it were stationary. However, the trimming member 16 if worn, may be readily replaced. The disk 6 may be used until the beveled edges 12 and 14 have been almost worn away at which time the disk is rebeveled at 45°.

The speed of the disk 6 past the knife edge is an important factor in achieving successful trimming. We have found that the most successful trimming takes place when the peripheral speed of the disk 6 is from 2800 to 3200 r.p.m. As the speed is increased above 3200 it tends to overheat the trimming member 16 and below 2800 the efficiency falls off. It will be appreciated that as the disk 6 becomes smaller through wear its peripheral speed at constant r.p.m. decreases. Accordingly, when it reaches the lower limit of efficiency it must be replaced or its r.p.m. must be increased which is readily accomplished by controlling the speed of the motor driving the shaft 4.

Having thus described our invention, what we claim as new and desire to secure by Letters Patent of the United States is:

1. A machine for trimming flash from molded outsoles and the like having, in combination, a power driven disk of hard fiber reinforced resin rotatable about a first axis, said disk comprising an uninterrupted cylindrical periphery, a substantially flat flash engaging surface normal to said first axis and a conical surface interposed between and intersecting both said cylindrical periphery and the flash engaging surface, a frusto-conical knife having a substantially smaller diameter than said resin disk, means mounting the knife for rotation about an axis normal to said first axis and spaced from the central plane of rotation of said disk with only a portion of the larger plane surface of said knife being in engagement with the cylindrical periphery of the disk, the axis of the knife being spaced outwardly from and parallel to the flat flash engaging surface, a trimming location comprising an acutely angular notch between said disk and said knife defined by the larger plane surface of the frusto-conical knife and a line lying in the conical surface of the resin disk at the point of intersection between said disk and said knife whereby said flash engaging surface of the rotary disk pulls the flash under tension against the edge of the knife at said trimming location.

2. A flash trimming machine in accordance with claim 1 wherein said knife mounting means includes means for urging said knife yieldingly into engagement with said resin disk.

3. A flash trimming machine in accordance with claim 1 wherein said knife mounting means includes means for adjusting the knife heightwise relatively to said resin disk and in a horizontal direction toward and away from said first axis.

References Cited in the file of this patent

UNITED STATES PATENTS

| | | |
|---|---|---|
| 123,605 | Ayres et al. | Feb. 13, 1872 |
| 703,213 | Parcells | June 24, 1902 |
| 1,289,485 | Lewis | Dec. 31, 1918 |
| 1,361,531 | Morris | Dec. 7, 1920 |
| 1,618,191 | Hemberger | Feb. 22, 1927 |
| 1,855,794 | Dorner | Apr. 26, 1932 |
| 2,256,306 | Ziegler | Sept. 16, 1941 |
| 2,447,617 | Nelson | Aug. 24, 1948 |
| 2,634,810 | Cox | Apr. 14, 1953 |
| 3,009,616 | Gadd et al. | Nov. 21, 1961 |